US012694042B2

(12) United States Patent
Russo et al.

(10) Patent No.: US 12,694,042 B2
(45) Date of Patent: Jul. 28, 2026

(54) ITEM RETRIEVAL USING FITMENT DATA-BASED PART CLUSTERING

(71) Applicant: eBay Inc., San Jose, CA (US)

(72) Inventors: Antonio Russo, Campbell, CA (US); Sarabdeep Singh Multani, San Jose, CA (US); Prathihasth Rekabu, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/745,487

(22) Filed: Jun. 17, 2024

(65) Prior Publication Data

US 2025/0384062 A1     Dec. 18, 2025

(51) Int. Cl.
*G06F 16/28*          (2019.01)

(52) U.S. Cl.
CPC .................................. *G06F 16/285* (2019.01)

(58) Field of Classification Search
CPC ...................................................... G06F 16/285
See application file for complete search history.

(56) References Cited

U.S. PATENT DOCUMENTS

| | | | |
|---|---|---|---|
| 10,783,569 B2 | 9/2020 | Jadhav et al. | |
| 10,902,460 B2 | 1/2021 | Moissinac et al. | |
| 10,949,907 B1 * | 3/2021 | Jain ...................... | G06V 10/806 |
| 2010/0082623 A1 | 4/2010 | Arora et al. | |
| 2011/0131595 A1 * | 6/2011 | Xue ................... | H04N 21/4826 |
| | | | 725/9 |
| 2015/0046281 A1 | 2/2015 | Shivaswamy et al. | |

| | | | |
|---|---|---|---|
| 2016/0189114 A1 * | 6/2016 | Cattone ................ | G06Q 10/087 |
| | | | 705/28 |
| 2018/0130071 A1 * | 5/2018 | Yao ..................... | G06Q 30/0185 |
| 2021/0012405 A1 * | 1/2021 | Wadhwa ............ | G06Q 30/0631 |
| 2021/0233129 A1 | 7/2021 | Bikumala et al. | |
| 2021/0241343 A1 * | 8/2021 | Arora ................. | G06Q 30/0633 |

(Continued)

FOREIGN PATENT DOCUMENTS

| | | |
|---|---|---|
| CN | 113762371 A | 12/2021 |
| EP | 4293537 A1 | 12/2023 |
| WO | 2024/058712 A1 | 3/2024 |

OTHER PUBLICATIONS

EBay : "eBay Motors Launches New Purchase Protections for Auto Parts & Accessories", Ebay Motors, Feb. 14, 2023. 5 pages.

(Continued)

*Primary Examiner* — Richard L Bowen
(74) *Attorney, Agent, or Firm* — Shook Hardy & Bacon L.L.P.

(57)          ABSTRACT

Some aspects relate to technologies for performing item retrieval on a listing platform using clusters of interchangeable parts formed using fitment data. In accordance with some aspects, item data is accessed for each of a plurality of part item listings on a listing platform, where the item data for each part item listing includes fitment data. An item embedding is generated for each part item listing using the item data. The item embeddings are clustered to generate a plurality of clusters, wherein each cluster includes one or more item embeddings. Cluster data is stored for the plurality of clusters. The cluster data for each cluster associates a cluster identifier and an item listing identifier for each item embedding in the cluster. The cluster data can be leveraged to perform item retrieval for the listing platform.

20 Claims, 9 Drawing Sheets

(56) References Cited

U.S. PATENT DOCUMENTS

| | | | | |
|---|---|---|---|---|
| 2021/0241363 | A1* | 8/2021 | Yang | ......................... G06N 3/09 |
| 2021/0303638 | A1 | 9/2021 | Zhong et al. | |
| 2022/0245702 | A1* | 8/2022 | Sundaresan | .............. G06N 7/01 |
| 2022/0351066 | A1 | 11/2022 | Bikumala et al. | |
| 2023/0206314 | A1 | 6/2023 | Periyathambi et al. | |

OTHER PUBLICATIONS

MyFitment : "The Ultimate Guide to Selling Auto Parts Online in 2020", myFitment, Available at : <https://myfitment.com>, 2020, 18 pages.
Extended European Search Report received for European Patent Application No. 25182343.1, mailed on Jul. 11, 2025, 9 pages.

* cited by examiner

600

602
RECEIVE ITEM DATA INCLUDING FITMENT DATA FOR PART ITEM LISTINGS

604
CAUSE EMBEDDING MODEL TO GENERATE ITEM EMBEDDINGS

606
CLUSTER PART ITEM LISTINGS BASED ON ITEM EMBEDDINGS

608
STORE CLUSTER DATA

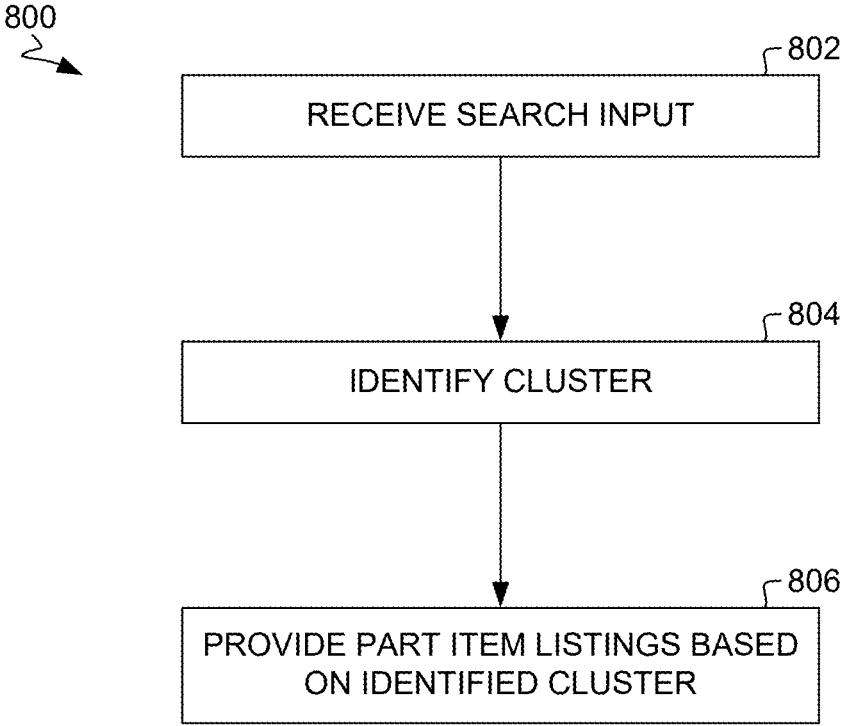

800

┌─────────────────────────────────────┐ ⌐802
│         RECEIVE SEARCH INPUT          │
└─────────────────────────────────────┘

┌─────────────────────────────────────┐ ⌐804
│            IDENTIFY CLUSTER           │
└─────────────────────────────────────┘

┌─────────────────────────────────────┐ ⌐806
│  PROVIDE PART ITEM LISTINGS BASED     │
│       ON IDENTIFIED CLUSTER           │
└─────────────────────────────────────┘

*FIG. 8*

ITEM RETRIEVAL USING FITMENT DATA-BASED PART CLUSTERING

BACKGROUND

Listing platforms, such as e-commerce websites, are online platforms that offer products, services, digital content (e.g., music, videos, etc.), or other items to users. Such platforms typically offer a vast number of items. While some items are relevant to any given user, the majority is not. As a result, item retrieval for listing platforms is a particular Internet-centric problem that has proven to be difficult to fully address. That is, given a large number of items available on a listing platform, what items should be retrieved and presented to a user and in what order.

Given the vast number of items available, listing platforms include functionality, such as search and recommendation, to assist users in finding items of interest on the platforms. For instance, listing platforms often provide search capabilities that receive user queries and return search results identifying items relevant to the user queries. Listing platforms also often leverage recommendation systems to recommend items that are likely of interest to users based on a variety of information, such as an item currently being viewed by a user, user attributes, and user behavior on the listing platforms (e.g., previous item views, purchases, etc.). Some categories of items, such as automobile parts, present a particular challenge for item retrieval given the vast number of parts and the compatibility of the parts with different automobiles.

SUMMARY

Some aspects of the present technology relate to, among other things, performing item retrieval on a listing platform using clusters of interchangeable parts formed using fitment data. In accordance with some aspects, item data is accessed for each part item listing available on a listing platform. The item data includes fitment data that provides information indicating compatibility of a part with an automobile, for instance, by identifying a compatible make, model, year, trim, and engine. The item data can include additional information from each part item listing, such as item title, item description, and structured data (i.e., attribute name-value pairs such as brand and MPN). The item data for each part item listing is provided to an embedding model, which outputs an item embedding for each part item listing.

The item embeddings are clustered to provide clusters of part item listings for interchangeable parts. In some aspects, the clustering is based on similarity scores (e.g., cosine similarity) between pairs of part item listings. Constraints can also be applied that provide rules that dictate pairs of part item listings are connected or not connected regardless of similarity score. A cluster identifier is assigned to each cluster, and cluster data is stored that associates cluster identifiers with item listing identifiers for part item listings in each cluster. When input is received (e.g., a search query in the context of search or a seed item in the context of recommendation), the cluster data is used to identify a cluster relevant to the input. A response to the input is returned that identifies part item listings from the identified cluster (e.g., search results or recommendations that include part item listings from the cluster).

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 8 is a flow diagram showing a method for performing item retrieval using cluster data in accordance with some implementations of the present disclosure.

DETAILED DESCRIPTION

Overview

Figure 1:
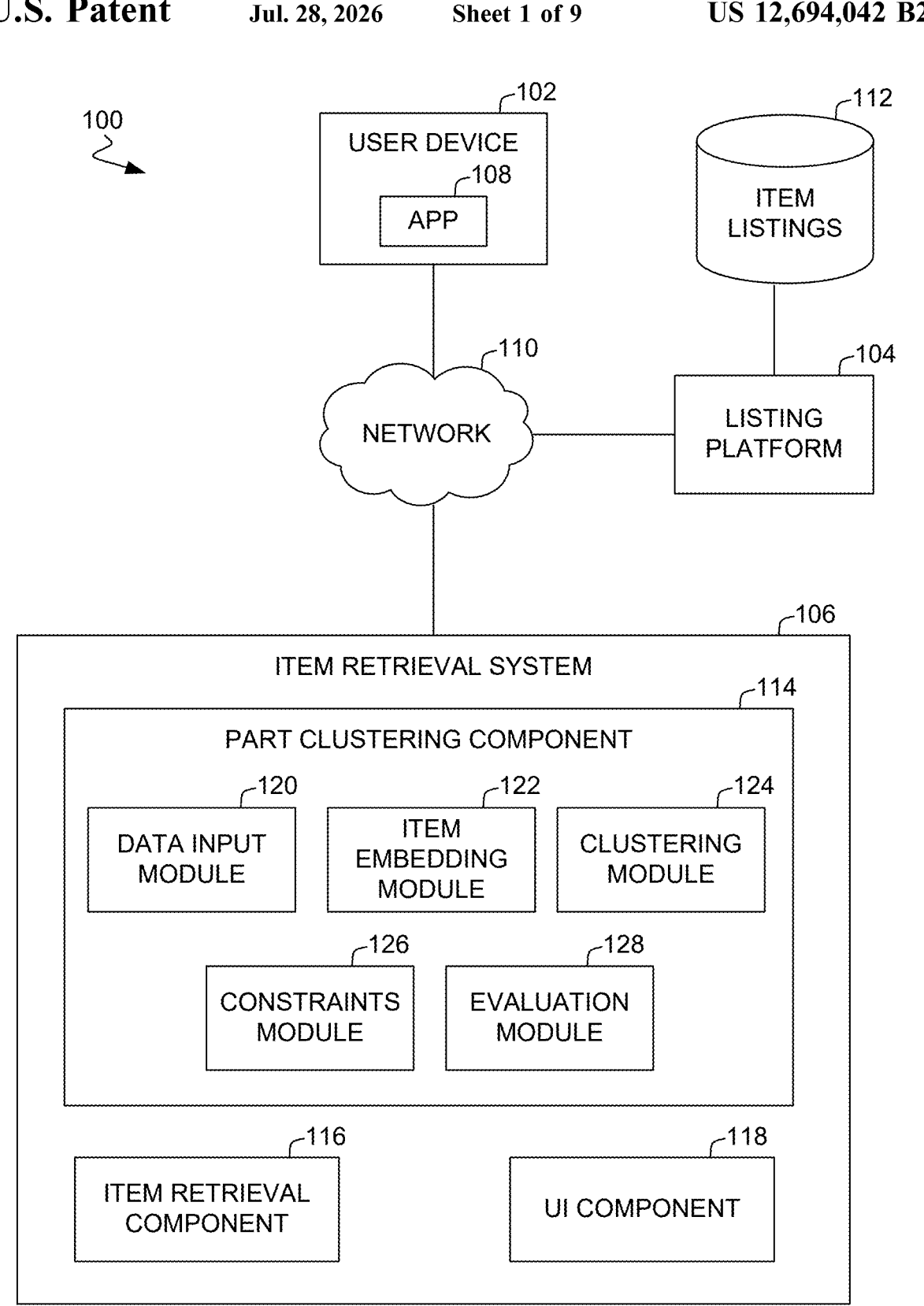
FIG. 1 is a block diagram illustrating an exemplary system in accordance with some implementations of the present disclosure.

Interchangeable parts are defined as parts that fit the same set of vehicles, and that have the same function in a vehicle. The ability of item retrieval systems to identify and return item listings for interchangeable parts on listing platforms is a technically challenging problem for various reasons. First, interchangeable parts can be produced by different manufacturers, so they are characterized by different manufacturer part numbers (MPNs). Second, coverage of MPNs on listings is low for some listing platforms as item listings for parts on the listing platforms may not include MPNs as a result of the sellers not being aware of the MPNs. Third, there are some alternative identifiers, such as interchange numbers, generated by catalog producers to address this issue, but these are not widely used/known and their coverage on some listings platforms is also often generally low.

While item retrieval systems are useful tools for locating items on listing platforms, current search and recommendation technologies present shortcomings in their ability to identify interchangeable parts. Among other things, the absence of part numbers (e.g., MPNs and interchange numbers) on some item listings and the missing association between different MPNs presents a technical challenge to item retrieval systems that adversely impacts their ability to surface interchangeable parts. These shortcomings in existing search and recommendation technologies used by conventional item retrieval systems often result in the consumption of an unnecessary quantity of computing resources (e.g., I/O costs, network packet generation costs, throughput, memory consumption, etc.). For instance, search systems for listing platforms sometimes receive search queries that include just an MPN. In those cases, current search systems can generally only identify item listings with that specific MPN, while missing items listings for compatible parts that don't include an MPN or that use a different MPN. This can result in low or even null results in some cases. The low and null results often require users to submit multiple queries before finding desired item listings.

In some cases of keyword or natural language queries, conventional search systems often return a large number of incompatible parts, thereby also requiring users to submit multiple queries to find the desired parts. For example, a user may issue a first query to a search engine of a listing platform that returns a set of search results. The user may browse the search results and select certain search results to access the corresponding item listings. Selection of search results causes retrieval of the corresponding item listings. Additionally, in some cases, applications are launched in order to render data associated with the item listings. When the search results don't return the appropriate items, the user typically enters subsequent queries.

In the context of recommendation, when recommended item listings are insufficient (not true interchangeable parts), users may select to view certain item listings and discover the listings are not what the user is seeking. This often results in the users turning to query-based searching, which can involve issuing numerous queries in an attempt to identify relevant item listings as discussed above. Moreover, when the recommended item listings are insufficient, users may abandon the platform, with consequent negative effects on conversion rates These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocols. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. For example, for some item retrieval systems, a query execution plan may need to be calculated each time a query is issued, which could require a system to find the least expensive query execution plan to fully execute the query. This decreases throughput and increases network latency, and can waste valuable time.

Aspects of the technology described herein improve the functioning of the computer itself in light of these shortcomings in existing search and recommendation technologies by providing a solution in which an item retrieval system leverages fitment data to generate clusters of interchangeable parts to facilitate item retrieval. In accordance with some aspects, a machine learning model-based approach is employed in the process of generating the clusters. In particular, an embedding model, which can comprise a neural network model, is used to generate item embeddings of item listings for parts (referred to herein as "part item listings"). Item data that includes fitment data for each part item listing is provided as input to the embedding model to generate the item embeddings. The fitment data generally comprises information indicating compatibility of a part with an automobile, for instance, by identifying a compatible make, model, year, trim, and engine, as well as a category (e.g., a leaf category ID). Beyond fitment data, the item data can include other information for each part item listings, such as, for example, an item title, an item description, and structured data (e.g., attribute name-value pairs identifying information such as brand and MPN).

The item embeddings are clustered to provide a number of clusters that group together part item listings for interchangeable parts. In some aspects, the clustering is based on similarity scores (e.g., cosine similarity) between pairs of item listings. One or more constraints can be applied as well, including positive and negative constraints. A positive constraint dictates that two part item listings are clustered together regardless of their similarity score if a rule of the positive constraint is met. A negative constraint dictates that two part item listings are not clustered together regardless of their similarity score if a rule of the negative constraint is met. Given the similarity scores and any applied constraints, a number of fully-connect graphs can be generated. Each graph includes nodes for part item listings with connections between all nodes based on the similarity scores of each pair satisfying a similarity score threshold with any constraints applied. Each fully-connected graph provides a cluster of part item listings. In some aspects, any price outliers in each fully-connected graph are identified and removed.

A cluster identifier is assigned to each cluster, and cluster data is stored in a data store for use in item retrieval. The cluster data can associate cluster identifiers with item listing identifiers for each part item listing in each cluster. In some aspects, the cluster data can associate cluster identifiers with part numbers (e.g., MPNs) of part item listings in each cluster.

To perform item retrieval using the cluster data, when an input is received, the cluster data is used to identify a cluster for the input. The input could be a search query in the context of search and one or more seed items in the context of recommendation. For example, a search query could be received that includes an MPN, and a cluster having part item listings with that MPN could be identified. In the case of a keyword-based search query, initial search results could be identified based on the keywords in the search query, and a relevant cluster could be identified based on those initial search results. In the context of recommendation, given a seed item, the cluster to which that seed item belongs could be identified.

After identifying a cluster for the input, part item listings from the cluster are returned in response to the input. In the context of search, this could include providing search results based on part item listings in the identified cluster. In the context of recommendation, this could include providing recommendations for part item listings in the identified cluster.

Aspects of the technology described herein provide a number of improvements over existing item retrieval technologies. For example, generating item embeddings using item data that includes fitment data facilitates clustering together item listings for compatible parts even when the item listings don't include part numbers (e.g., MPNs) or use different part numbers (e.g., different MPNs). The clusters improve the ability of the item retrieval system to return search results and provide recommendations for truly interchangeable parts.

Among other things, this provides for improved computing resource consumption relative to existing item retrieval technologies. For instance, the ability of the item retrieval system to provide item listings for interchangeable parts using aspects of the technology described herein eliminates (or at least reduces) the repetitive user queries, search result selections, and rendering of item listings relative to conventional techniques because relevant item listings are provided without the need for users to continuously input various search queries to access search results and/or continuously make item selections to obtain further information around presented item listings. Accordingly, aspects of the technology described herein decrease computing resource consumption, such as packet generation costs. For instance, a user query (e.g., an HTTP request), would only need to traverse a computer network once (or fewer times relative to existing technologies). Specifically, the contents or payload of the user query is supplemented with header information or other metadata within a packet in TCP/IP and other protocols once for the initial user query. Such packet for a user query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing item retrieval technologies). As described above, the inadequacy of existing search and recommendation technologies results in repetitive user queries, search result selections, and item listing renderings. This causes multiple traversals to disk. In contrast, aspects described herein reduce storage device I/O because the computing system receives fewer inputs and so the computing system does not have to reach out to the storage device as often to perform a read or write operation. Accordingly, there is not as much wear on components, such as a read/write head, because disk I/O is substantially reduced.

Example System for Item Retrieval Using Fitment Data-Based Part Clustering

With reference now to the drawings, FIG. 1 is a block diagram illustrating an exemplary system 100 for performing item retrieval on a listing platform by forming clusters of interchangeable parts based on fitment data in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, a listing platform 104, and an item retrieval system 106. Each of the user device 102, the listing platform 104, and the item retrieval system 106 shown in FIG. 1 can comprise one or more computer devices, such as the computing device 900 of FIG. 9, discussed below. As shown in FIG. 1, the user device 102, the listing platform 104, and the item retrieval system 106 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the listing platform 104 and the item retrieval system 106 could each be provided by multiple server devices collectively providing the functionality of the listing platform 104 and the item retrieval system 106 as described herein. Additionally, other components not shown may also be included within the network environment.

The user device 102 can be a client device on the client-side of operating environment 100, while the listing platform 104 and the item retrieval system 106 can be on the server-side of operating environment 100. The listing platform 104 and/or the item retrieval system 106 can each comprise server-side software designed to work in conjunction with client-side software on the user device 102 so as to implement any combination of the features and functionalities discussed in the present disclosure. For instance, the user device 102 can include an application 108 for interacting with the listing platform 104 and/or the item retrieval system 106. The application 108 can be, for instance, a web browser or a dedicated application for providing functions, such as those described herein. This division of operating environment 100 is provided to illustrate one example of a suitable environment, and there is no requirement for each implementation that any combination of the listing platform 104 and the item retrieval system 106 remain as separate entities. For instance, in some aspects, the item retrieval system 106 is a part of the listing platform 104. While the operating environment 100 illustrates a configuration in a networked environment with a separate user device, listing platform, and item retrieval system, it should be understood that other configurations can be employed in which aspects of the various components are combined.

The user device 102 may comprise any type of computing device capable of use by a user. For example, in one aspect, a user device may be the type of computing device 900 described in relation to FIG. 9 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the listing platform 104 and/or the item retrieval system 106 via the user device 102.

The listing platform 104 can be implemented using one or more server devices, one or more platforms with corresponding application programming interfaces, cloud infrastructure, and the like. The listing platform 104 generally provides, to user devices such as the user device 102, item listings describing items (physical or digital) available for purchase, rent, streaming, download, etc. For instance, the listing platform 104 could comprise an e-commerce platform, in which listed products or services are available for purchase by users of the user device 102 upon navigation to the listing platform 104. In accordance with various aspects described herein, the item listings available on the listing platform 104 include item listings for automobile parts— i.e., part item listings.

The functionality of the listing platform 104 includes provision of interfaces enabling surfacing of item listings for items to users of the listing platform 104. Item data for item listings available via the listing platform 104 are stored by the item listings data store 112. The item data for each item listing may include, for instance, information relating to an item comprising one or more of: an item title, an item description, a category, a price in a currency, reviews, images of the item, shipment options, a rating, a condition of the item, a size of the item, a color of the item, etc. The item data can include structured data (attribute name-attribute value pairs) and unstructured text. The item data can further include search information, such as search queries for which an item listing was returned as a search result and/or resulted in some user action (e.g., click, purchase, etc.) The item data for part item listings also includes fitment data. Fitment data indicates compatibility of a part with an automobile, for instance by identifying a compatible make, model, year, trim, and engine, as well as a category (e.g., a leaf category ID) for the part. The item data for part item listings can further include information identifying a brand and a part number (e.g., manufacturer part number (MPN), interchange part numbers, etc.). In aspects, each item is associated with one or more categories from a category hierarchy for the listing platform, including meta-categories and leaf categories. For example, the meta-categories are each divisible into subcategories (or branch categories), whereas leaf categories are not divisible.

The item retrieval system 106 facilitates item retrieval for the listing platform 104, including providing search and/or recommendation functions that return item listings to users relevant to each user's interests. As shown in FIG. 1, the item retrieval system 106 includes a part clustering component 114, an item retrieval component 116, and a user interface component 118. The components of the item retrieval system 106 may be in addition to other components that provide further additional functions beyond the features described herein. The item retrieval system 106 can be implemented using one or more server devices, one or more platforms with corresponding application programming interfaces, cloud infrastructure, and the like. While the item retrieval system 106 is shown separate from the listing platform 104 and the user device 102 in the configuration of FIG. 1, it should be understood that in other configurations, some of the functions of the item retrieval system 106 can be provided on the listing platform 104 and/or the user device 102. Additionally, while the components are shown as part of the item retrieval system 106, in other configurations, one or more of the components and/or modules thereof can be provided by the listing platform 104 or another location not shown in FIG. 1. The components can be provided by a single entity or multiple entities.

In some aspects, the functions performed by components of the item retrieval system 106 are associated with one or more applications, services, or routines. In particular, such applications, services, or routines may operate on one or more user devices, servers, may be distributed across one or more user devices and servers, or be implemented in the cloud. Moreover, in some aspects, these components of the item retrieval system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

Figure 2:
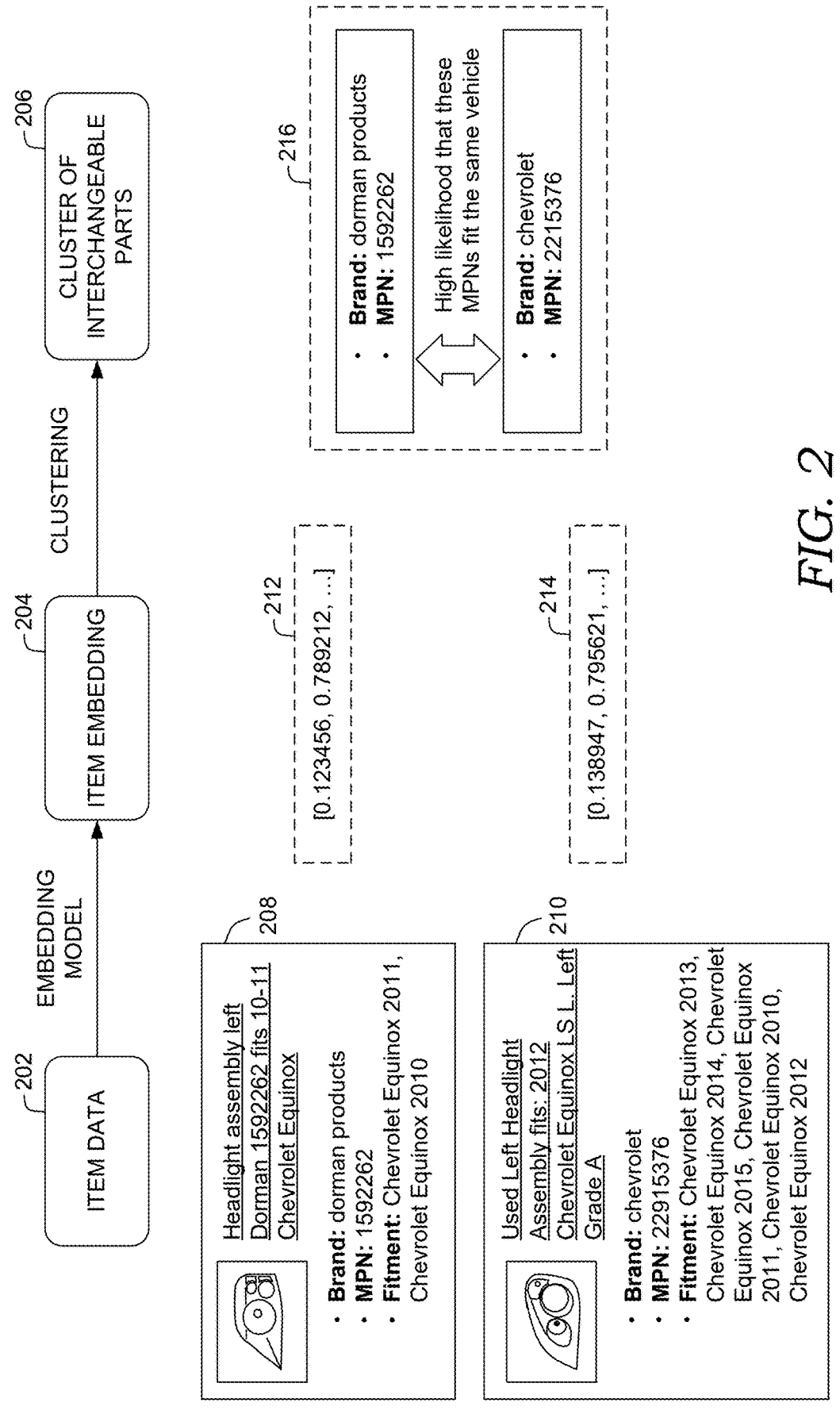
FIG. 2 is a diagram showing generating item clusters based on item data that includes fitment data for each item in accordance with some implementations of the present disclosure.

The part clustering component 114 forms clusters of part item listings, in which each cluster is considered to include interchangeable parts. FIG. 2 provides an overview of the operation of the part clustering component 114. As shown in FIG. 2, item data 202 for each part item listing is provided as input to an embedding model, which generates an item embedding 204 for each part item listing. Clustering is performed using the item embeddings to generate a cluster 206 of part item listings for interchangeable parts.

For illustration purposes, FIG. 2 includes a simple example of two part item listings being clustered together by this process. As shown in FIG. 2, the item data 208 for the first part item listing and the item data 210 for the second part item listing each includes an item title, attribute name-value pairs for brand and MPN, and fitment data. It should be understood that the type of item data shown in FIG. 2 is provided by way of example only and not limitation. A first item embedding 212 is generated from the item data 208 for the first part item listing, and a second item embedding 214 is generated from the item data 210 for the second part item listing. Based on these item embeddings 212, 214, a cluster 216 is formed that includes the two part item listings.

With reference again to FIG. 1, the part clustering component 114 includes a data input module 120, an item embedding module 122, a clustering module 124, a constraints module 126, and an evaluation module 128. The data input module 120 accesses item data for part item listings available on the listing platform 104 and performs pre-processing to prepare the data for processing by the item embedding module 122. The item data can be retrieved from the item listings data store 112. The item data includes fitment data, which provides information about the compatibility of an automotive part with a specific automobile. The fitment data identifies which automobiles an automotive part is designed to fit and function properly with. By way of example only and not limitation, the fitment data can include any combination of the following: make (i.e., the brand or manufacturer of the vehicle, such as Toyota, Ford, BMW, etc.); model (i.e., specific model of the vehicle, such as Camry, F-150, 3 Series, etc.); year (i.e., the year of manufacture of the vehicle, such as 2010, 2015, 2020, etc.); trim (i.e., a specific version or variant of a vehicle model that typically distinguishes different levels of features, options, and configurations available for that model); and engine (i.e., engine specifications providing details about the engine, such as horsepower, torque, fuel type, and emission standards). In some configurations, the fitment data is based on a fitment graph that identifies relationships between various parts of the fitment data, such as, for instance, what makes go with which models, what trims go with which makes, etc.

The item data retrieved by the data input module 120 can include a variety of additional information regarding a part item listing beyond fitment data. By way of example only and not limitation, the item data retrieved for a part item listing can include an item title, an item description (unstructured text), attribute name-value pairs (structured text), a price, a category, and item reviews. In some aspects, the structured text includes information identifying a brand and/or a manufacturer part number for the part item. The item data can further include search-related information regarding a part item listing, such as search queries for which the part item was returned as a search result or that resulted in a click, purchase, or other user action.

The item embedding module 122 generates an item embedding for each part item listing based on its item data. In particular, the item embedding module 122 employs an embedding model that, when given input data for a given part item listing, generates an item embedding for the part item listing. An embedding model comprises a machine learning model, such as a neural network, that transforms input data into a vector representation, referred to herein as an embedding, in an embedding space (sometimes referred to as a latent vector space). The embedding space of the embedding model provides a multi-dimensional space in which the similarity between embeddings can be determined, for instance, based on a geometric distance between embeddings in the embedding space. As such, an item embedding generated by the embedding model for a part item listing based on its item data comprises a vector representation of the part item listing. The item embeddings generated by the embedding model of the item embedding module 122 allow for the similarity between part item listings to be determined for clustering purposes, as will be described in further detail below.

In some configurations, the embedding model used by the item embedding module 122 to generate item embeddings can be part of a language model that includes a set of statistical or probabilistic functions to perform Natural Language Processing (NLP) in order to understand, learn, and/or generate human natural language content. For example, a language model can be a tool that determines the probability of a given sequence of words occurring in a sentence or natural language sequence. Simply put, it can be a model that is trained to predict the next word in a sentence. A language model is called a large language model (LLM) when it is trained on enormous amount of data and/or has a large number of parameters. Some examples of LLMs are GOOGLE's BERT and OpenAI's GPT-3 and GPT-4. These models have capabilities ranging from writing a simple essay to generating complex computer codes-all with limited to no supervision. Accordingly, an LLM can comprise a deep neural network that is very large (billions to hundreds of billions of parameters) and understands, processes, and produces human natural language by being trained on massive amounts of text. These models can predict future words in a sentence letting them generate sentences similar to how humans talk and write.

As previously noted, in accordance with some aspects, the embedding model used by the item embedding module 122 comprises a neural network. As used herein, a neural network comprises multiple operational layers, including an input layer and an output layer, as well as any number of hidden layers between the input layer and the output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

In some configurations, the embedding model used by the item embedding module 122 is a pre-trained model (e.g., a BERT model) that has not been fined-tuned. In other configurations, the embedding model is a model that is built and trained from scratch or a pre-trained model that has been fine-tuned. In such configurations, the embedding model can be trained or fine-tuned using training data. For instance, the training data can comprise item data for part item listings, including fitment data for the part items. During training, weights associated with each neuron can be updated. Originally, the embedding model can comprise random weight values or pre-trained weight values that are adjusted during training. In one aspect, the embedding model is trained using backpropagation. The backpropagation process comprises a forward pass, a loss function, a backward pass, and a weight update. This process is repeated using the training data. For instance, each iteration could include providing an input text string to the model (e.g., text for item data from a part item data with tokens masked), generating an output text string by the embedding model (e.g., the input text with predicted tokens for the masked token locations), comparing (e.g., computing a loss) the output text string from the embedding model with a ground truth output text string (e.g., the input text without any masked tokens), and updating the model based on the comparison. Once trained, the weight associated with a given neuron can remain fixed. The other data passing between neurons can change in response to a given input. Retraining the network with additional training data can update one or more weights in one or more neurons.

The clustering module 124 forms clusters of part item listings based on the item embeddings. While a cluster can include an individual part item listing, at least some of the clusters include two or more part item listings that are grouped together based on similarity of their item embeddings. Each cluster generated by the clustering module 124 can be considered a group of interchangeable parts that serve the same function and have the same fitment. The clustering module 124 can employ any of a variety of clustering approaches to cluster item embeddings, such as, for instance, k-means clustering, DBSCAN (Density-Based Spatial Clustering of Applications with Noise), mean shift clustering, or agglomerative clustering, to name a few.

In some particular configurations, the clustering module 124 employs a graph-based clustering approach. In accordance with such configurations, similarity scores are generated between pairs of part item listings based on their item embeddings. The similarity scores can comprise, for instance, cosine similarities computed between pairs of item embeddings. In some aspects, a similarity matrix is generated that comprises an M×M matrix (where M is the number of part item listings) with the similarity score between each pair of part items. In some aspects, the similarity scores are used to form fully-connected graphs in which part item listings are connected based on their similarity score satisfying a similarity score threshold. Each part item listing in a fully-connected graph is connected to all other part item listings in the graph (i.e., all similarity scores satisfy the similarity score threshold). The similarity score threshold can comprise a hyper-parameter that is configurable, for instance, based on precision, coverage, and/or recall.

Figure 3:
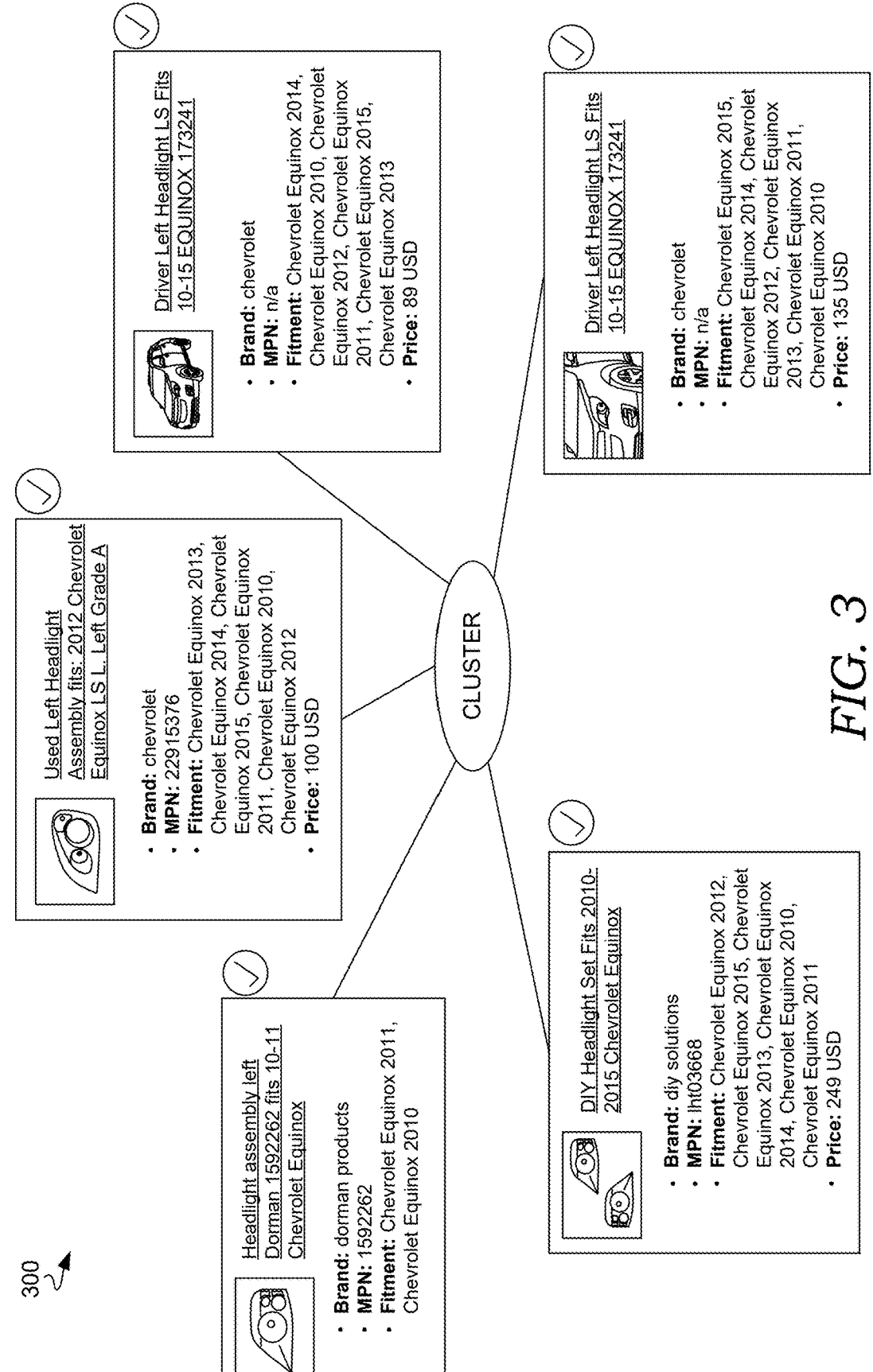
FIG. 3 is a diagram showing an example item cluster formed in accordance with some implementations of the present disclosure.

FIG. 3 provides an example of a cluster 300 that includes five part item listings that have been grouped together, for instance, by the clustering module 124 of FIG. 1. These part item listings are considered to be interchangeable parts based on being clustered together. As shown in FIG. 3, the part item listings have similar item titles and overlapping fitment data, resulting in the part item listings being clustered together. As can also be seen from FIG. 3, the cluster 300 includes part item listings with different brands and different MPNs, including MPNs with null values.

In some aspects, the clustering module 124 also performs price outlier detection to remove part item listings that are price outliers from clusters. Given a cluster of part item listings, the clustering module 124 accesses price data for each part item listing and determines whether the price of any part item listing is an outlier from the prices of other part item listings in the cluster. Any price outliers in a cluster are removed from the cluster. This addresses situations in which a part item listing can appear to be an interchangeable part based on its item data, but in fact, is a different part. For instance, an accessory of part items could include similar item data (e.g., the same exact fitment data), while not being an interchangeable part. Such accessories typically have substantially different prices from the part items. As such, the clustering module 124 can employ price outlier detection to identify such items in clusters and remove them.

Figure 4:
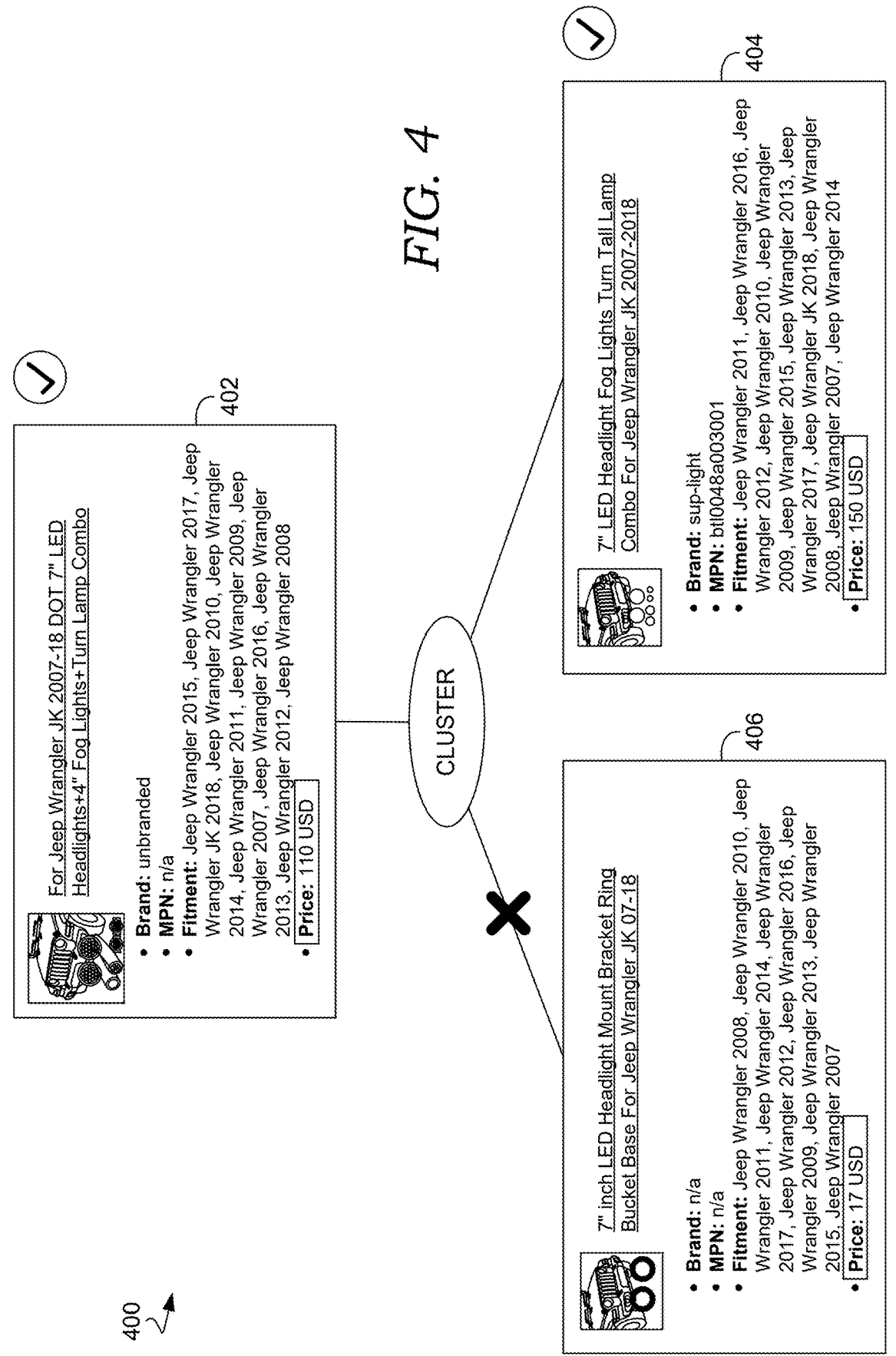
FIG. 4 is a diagram showing removing a price outlier item from a cluster in accordance with some implementations of the present disclosure.

FIG. 4 provides an example illustrating price outlier detection and removal on a cluster 400. In the example of FIG. 4, three part item listings 402, 404, 406 have been grouped together in the cluster 400. The fitment data and item title for all three part item listings are similar, which resulted in the part item listings being clustered together. However, the price (17 USD) of part item listing 406 is significantly different from the prices (110 USD and 150 USD, respectively) of the other part item listings 402, 404. As such, the part item listing 406 is identified as a price outlier and removed from the cluster 400.

While price outliers can be identified using a variety of different approaches, in some configurations, the clustering module 124 identifies price outliers based on the median price for the cluster. For instance, given the price data for part item listings in a cluster, the median price, $\overline{X}$=median (X), and the median absolute deviation, MAD=median ($|X_i-\overline{X}|$), are computed for the cluster. A lower bound, $\overline{X}-k*$MAD, and/or an upper bound, $\overline{X}+k*$MAD, are determined, where k is a hyper-parameter that can be configured, for instance, based on precision, coverage, and/or recall. Any part item listing having a price outside of the lower bound and/or upper bound is identified as a price outlier and removed from the cluster.

The constraints module 126 of the part clustering component 114 sets forth constraints that can be applied when generating clusters. This can include any number of positive constraints and/or any number of negative constraints. A positive constraint sets forth a rule dictating that part item listings are clustered together regardless of the similarity of their item embeddings when the rule is met. For instance, a positive constraint could dictate that two part item listings are clustered together regardless of whether the similarity score for their item embeddings satisfy a similarity score threshold if the rule of the positive constraint is met by the two part items. Example rules of positive constraints include having the same brand, having the same MPN, having the same product identifier, or any combination thereof.

A negative constraint sets forth a rule dictating that part item listings are not clustered together regardless of the similarity of their item embeddings when the rule is met. For instance, a negative constraint could dictate that two part item listings are not clustered together regardless of whether the similarity score for their item embeddings satisfy a similarity score threshold if the rule of the negative constraint is met by the two part items. By way of example only and not limitation, rules of negative constraints could be defined based on fitment data. For instance, a rule could require that the part items have fitment data with a minimum number of fitments in common (e.g., same make, same model, same year).

The evaluation module 128 evaluates the performance of the clustering module 124 in generating clusters that accurately capture interchangeable parts and also provides for updating aspects to improve accuracy. The evaluation module 128 facilitates assessment of clusters by evaluators. This could include providing clusters of part item listings to evaluators who identify each part item listing as belonging or not belonging to each cluster. The evaluators can also assess whether there are instances in which separate clusters include the same interchangeable part. Based on the evaluator input, the evaluation module 128 determines the accuracy of the clustering module 124 for both over-inclusivity (i.e., clusters including incompatible parts) and under-inclusivity (i.e., multiple clusters for the same interchangeable part). The accuracy can then be used to update parameters of the clustering module 124 in forming clusters. For instance, the similarity score threshold can be adjusted to address over-inclusivity (e.g., increasing the similarity score threshold) and under-inclusivity (e.g., decreasing the score threshold). Additionally, aspects of the price outlier detection can be adjusted, such as a coefficient used to determine a distance from a mean price for identifying price outliers.

The item retrieval component 116 of the item retrieval system 106 leverages cluster data to select item listings for part items for search and/or recommendation. Given an input (e.g., a search query in the context of search or a seed item in the context of recommendation), the item retrieval component 116 identifies a cluster relevant to the input. The item retrieval component 116 then returns one or more of the part item listings based on the identified cluster (e.g., as search results or recommendations) in response to the input.

In the context of search, when a search query is received from a user device, such as the user device 102, the item retrieval component 116 uses the cluster data to select and return search results in response to the search query. In particular, the item retrieval component 116 identifies a cluster relevant to the search query and provides search results based on that identified cluster.

A relevant cluster for a search query can be identified in a number of different manners. For instance, in some cases, the search query can comprise a part number, such as an MPN. In such cases, a cluster that includes part item listings with that part number is identified. For instance, a mapping between part numbers and cluster identifiers could be stored and used to identify clusters for search queries with part numbers. In other cases, initial search results for a search query can be identified, and a cluster could be identified based on part item listings included in those initial search results. This could include identifying the cluster for each part item listing included in the initial search results (e.g., using a mapping between item identifiers and cluster identifiers) and selecting a cluster that corresponds with a threshold percentage of the initial search results.

Search results based on an identified cluster can be returned to a user device in a number of different manners. In some cases, a search result page is provided to the user device that presents a list of search results that include part item listings in the cluster. In other instances, a search result page is provided that includes a primary set of search results, and an option to expand the search to include part item listings from the cluster. For instance, in the case in which the user query includes a part number (e.g., an MPN), the search page could provide search results for part item listings that include the part number and a selectable option to view other part item listings that are considered to be interchangeable parts. If the user selects the option, part item listings from the cluster that don't have the part number in the search query are then provided for presentation. In still further aspects, a search result page could be provided that separates search results. For instance, in response to a search query with a part number (e.g., an MPN), a search results page could be provided that includes a first section with part item listings having the part number and a second section with part item listings from the cluster for that part number that don't have that same part number. In some cases, whether to include search results for part item listings from a cluster can be based on the number of search results identified for the search query not satisfying a threshold. For instance, if the search results include a low number (i.e., a number of search results below a threshold number) or null set, the set of search results can be supplemented with part item listings from the cluster.

In the context of recommendation, the item retrieval component 116 can use cluster data to select part item listings to recommend. This could be based on one or more seed items, such as a part item listing that a user is currently viewing or has previously viewed. The item retrieval component 116 identifies a cluster relevant to the seed item(s), and provides one or more recommended part item listings from that cluster. By way of example to illustrate, suppose a user selects to view an item listing page for a particular part item listing. In that case, the item retrieval component 116 can identify a cluster to which that part item listing belongs (e.g., based on a mapping between item identifiers and cluster identifiers). The item retrieval component 116 can then select one or more part item listings from the identified cluster to provide as recommendation(s) for presentation on the item listing page.

The item retrieval system 106 further includes a user interface component 118 that provides one or more user interfaces for interacting with the listing platform 104 and/or the item retrieval system 106. While shown as part of the item retrieval system 106 in FIG. 1, in some configurations, the user interface component 118 can be part of the listing platform 104. The user interface component 118 provides one or more user interfaces to a user device, such as the user device 102. In some instances, the user interfaces can be presented on the user device 102 via the application 108, which can be a web browser or a dedicated application for interacting with the listing platform 104 and/or the item retrieval system 106. For instance, the user interface component 118 can provide user interfaces for, among other things, allowing users to enter search queries. The user interfaces can further provide search results and/or recommendations identifying part item listings selected by the item retrieval system 106 using cluster data as described herein.

Figure 5:
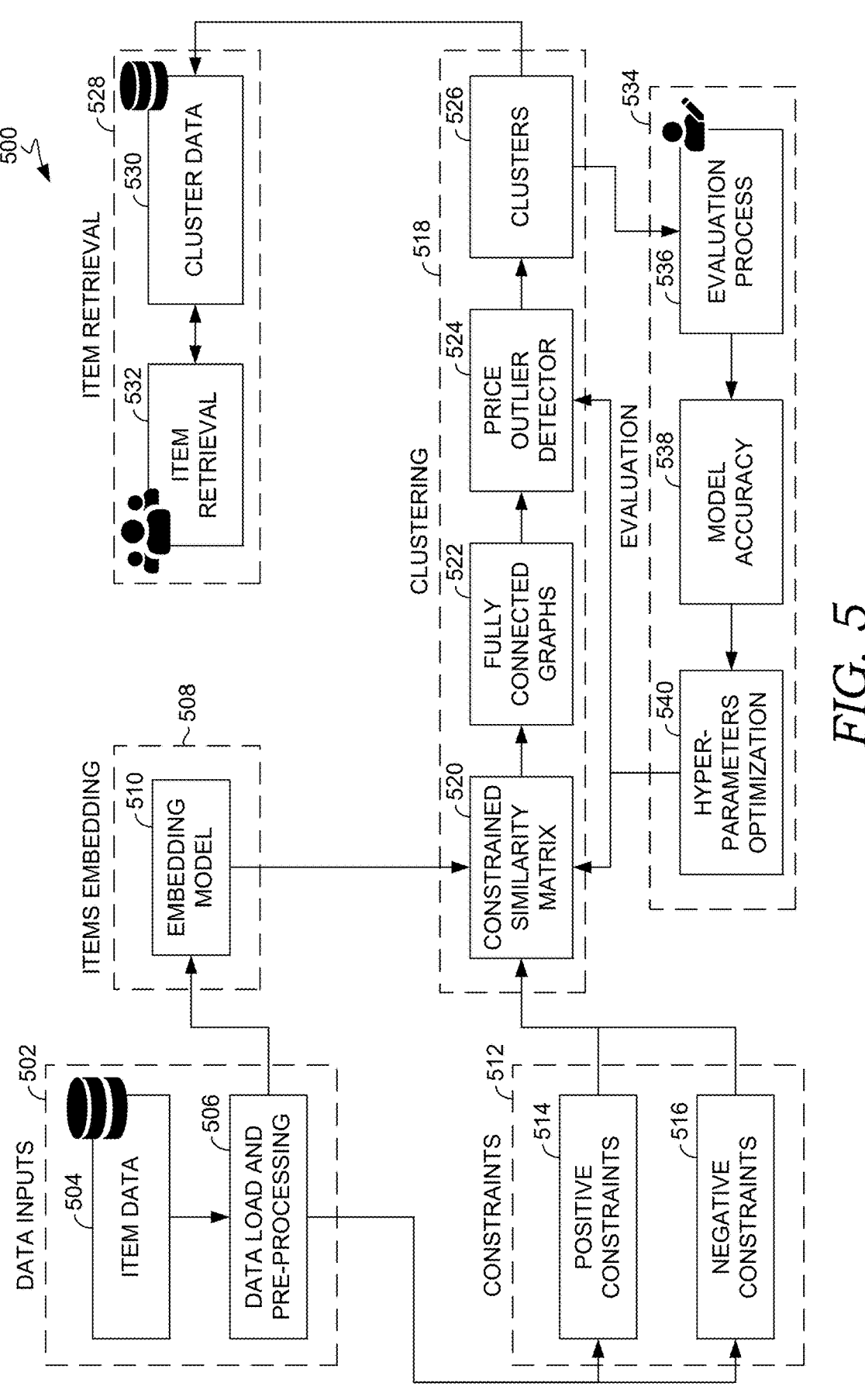
FIG. 5 is a block diagram showing operations to generate clusters of part item listings for item retrieval in accordance with some implementations of the present disclosure.

Turning next to FIG. 5, a block diagram is provided showing operations 500 to generate clusters of part item listings for item retrieval in accordance with some specific aspects of the present technology. Initially, a data inputs operation 502 is performed. This can include accessing item data 504 for part item listings (e.g., from the item listings data store 112 of FIG. 1) via a data load and pre-processing operation 506. An item embeddings operation 508 employs an embedding model 510 to generate item embeddings for each part item listing given its item data. Additionally, a constraints operation 512 applies constraints (e.g., positive and/or negative constraints) to item data for pairs of item listings to determine whether any constraints apply to any pairs.

A clustering operation 518 forms clusters of interchangeable parts. As shown in FIG. 5, a constrained similarity matrix 520 is generated using the item embeddings and any applied constraints. The constrained similarity matrix 520 identifies whether each pair of part item listings is connected, for instance, based on similarity of each pair (e.g., similarity score satisfying a similarity score threshold) and any applicable constraints. Fully connected graphs 522 are generated from the constrained similarity matrix 520. In particular, each fully connected graph includes part item listings that are all connected with each other part item listing based on the constrained similarity matrix 520. Price outlier detector 524 identifies any price outliers and removes the price outliers from the clusters. After price outliers are removed, a set of clusters 526 is provided. Each cluster corresponds with a fully-connected graph with any price outliers removed. Each cluster is assigned a cluster identifier, and cluster data 530 is stored. This can include storing data in a data store that associates cluster identifiers with part item listing identifiers for each part item listing in each cluster. In some instances, other cluster data can be stored, such as data associating cluster identifiers with MPNs of part item listings in each cluster.

An item retrieval operation 528 uses the stored cluster data 530 to facilitate item retrieval 532. For instance, in the context of search, given a search query, a relevant cluster is identified and search results provided based on part item listings in the identified cluster. In the context of recommendation, given one or more seed items, a relevant cluster is identified and recommendations provided based on part item listings in the identified cluster.

FIG. 5 also shows an evaluation operation 534. This can include an evaluation process 536 in which evaluators review clusters to identify instances in which part item listings are included in clusters that are not interchangeable parts and/or instances in which multiple clusters contain the same interchangeable part. Based on the results from the evaluation process 536, model accuracy 538 is accessed to identify, for instance, whether the clustering is over-inclusive or under-inclusive and the accuracy of price outlier detection. Hyper-parameter optimization 540 is performed based on the model accuracy 538. This can include updating the similarity score threshold used to identify connected pairs of part item listings to generate the constrained similarity matrix 520 and/or updating a parameter used to determine a distance from a mean price by price outlier detector 524.

Example Methods for Item Retrieval Using Fitment Data-Based Part Clustering

Figure 6:
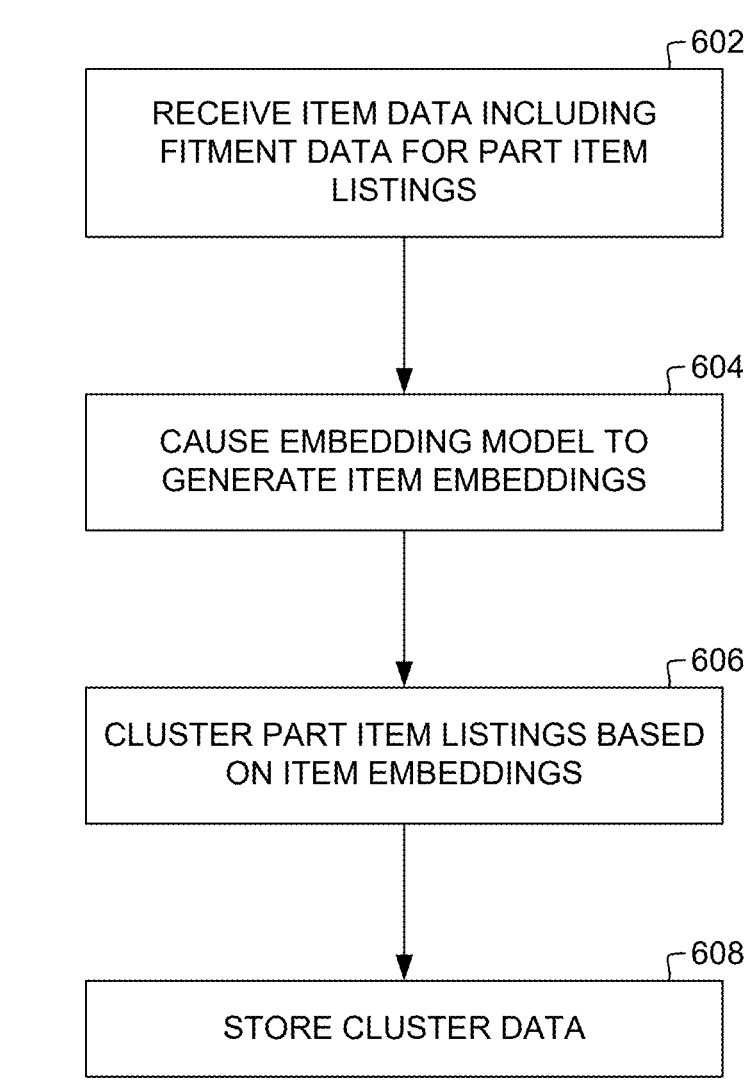
FIG. 6 is a flow diagram showing a method for generating clusters of part item listings and storing cluster data in accordance with some implementations of the present disclosure.

With reference now to FIG. 6, a flow diagram is provided that illustrates a method 600 for generating clusters of part item listings and storing cluster data in accordance with some aspects. The method 600 may be performed at least in part, for instance, by the part clustering component 114 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, item data for part item listings is accessed. The item data for each part item listing includes fitment data and can also include other textual data, such as, for instance, an item title, an item description (unstructured text), attribute name-value pairs (structured text), a price, a category, and item reviews. The item data can further include search information, such as search queries for which the associated part item listing has been returned as a search result and/or has resulted in certain actions for the part item listing (e.g., click, purchase, etc.).

An embedding model generates item embeddings for the part item listings based on the item data, as shown at block 604. For each part item listing, its item data is provided as input to the embedding model, which outputs an item embedding for the part item listing based on the item data.

As shown at block 606, part item listings are clustered based on the item embeddings. A variety of different clustering techniques can be employed, such as, for instance, k-means clustering, DBSCAN (Density-Based Spatial Clustering of Applications with Noise), mean shift clustering, or agglomerative clustering. In some configurations, a graph-based approach, such as that described below with reference to FIG. 7, can be employed to cluster the part item listings.

Cluster data is stored (e.g., in computer storage media), as shown at block 608. This can include assigning a cluster identifier to each cluster and storing the cluster identifier in association with various information. For instance, the cluster identifier for each cluster can be stored in association with item identifiers for part item listings in the cluster.

Figure 7:
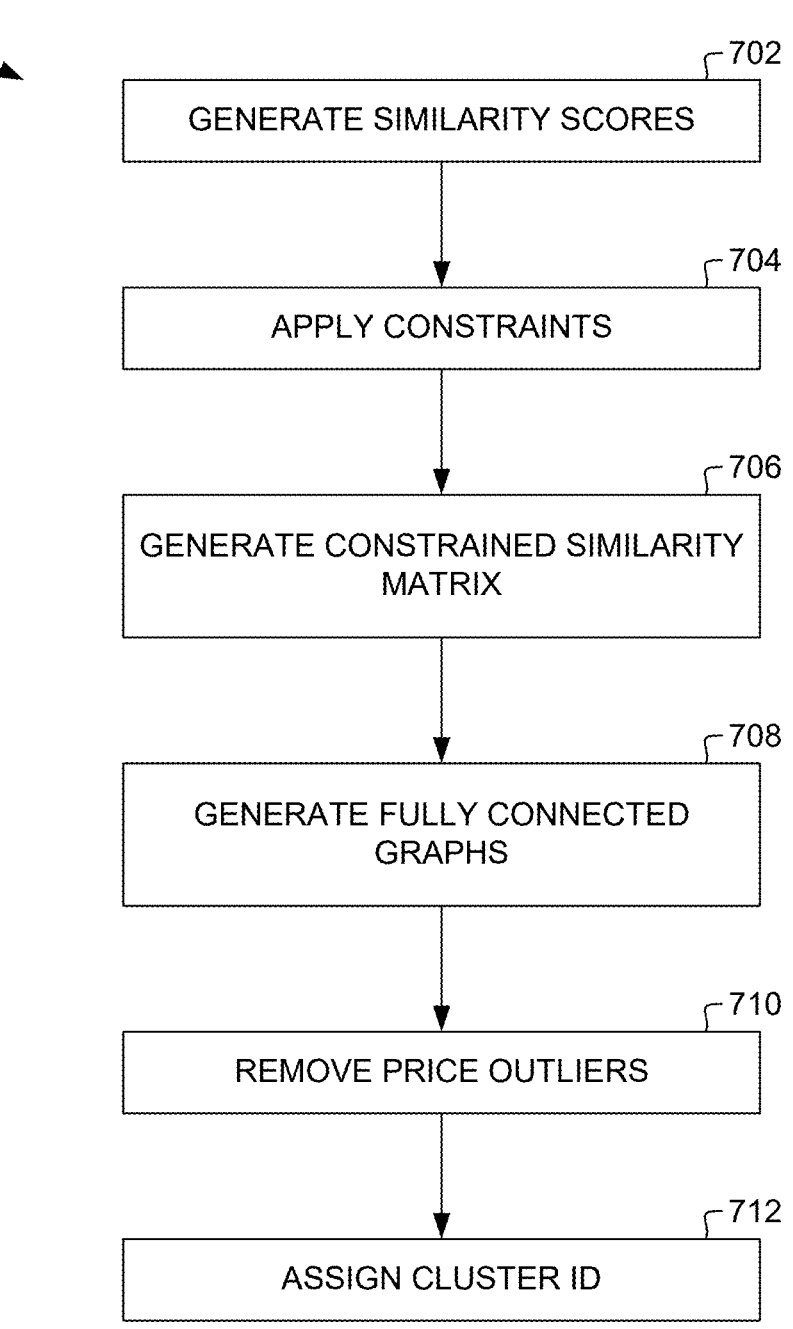
FIG. 7 is a flow diagram showing a method for a clustering items in accordance with some implementations of the present disclosure.

Turning next to FIG. 7, a flow diagram is provided showing a method 700 for clustering part item listings in some aspects. The method 700 can be performed at least in part, for instance, by the clustering module 124 of FIG. 1. As shown at block 702, similarity scores are generated between pairs of part item listings based on their item embeddings. The similarity scores can comprise, for instance, cosine similarity scores. If applicable, one or more constraints are applied, as shown at block 704. This can include applying a positive constraint in which two part item listings are clustered together regardless of their similarity score if a rule of the positive constraint is met. The can also include applying a negative constraint in which two part item listings are not clustered together regardless of their similarity score if a rule of the negative constraint is met.

A constrained similarity matrix is generated at block 706 based on the similarity scores and constraints. The constrained similarity matrix can be used to identify pairs of part item listings to cluster together based on their similarity scores and any applied constraints. As shown at block 708, fully-connected graphs are generated based on the constrained similarity matrix. In particular, each fully connected graph includes nodes representing part item listings that include connections with all other nodes based on similarity scores and applied constraints as set forth by the constrained similarity matrix.

As shown at block 710, any price outliers are removed from the fully-connected graphs. For a given fully-connected graph, this can include accessing price data for each part item listing in the fully-connected graph, computing a mean price based on the price data, and identifying any part item listings having a price outside a threshold distance from the median price as an outlier for removal.

Each fully-connected graph with any price outliers removed is considered a cluster. A cluster identifier is assigned to each cluster, as shown at block 712. Each cluster identifier is stored as cluster data for each cluster.

Turning next to FIG. 8, a flow diagram is provided showing a method 800 for performing item retrieval using cluster data for part item listings. The method 800 can be performed at least in part, for instance, by the item retrieval component 116 of FIG. 1. As shown at block 802, an input is received. For instance, in the context of search, the input can comprise a search query. In some aspects, a search query can identifier a part number, such as an MPN. In the context of recommendation, the input can comprise one or more seed items.

As shown at block 804, a cluster is identified based on the input. For instance, in the case of a search query having a part number, a cluster having part item listings with that part number is identified. In some aspects, initial search results for the search query are identified, and a cluster is identified based on the part item listings in the initial search results. In the context of recommendation, in some aspects, a cluster is identified based on one or more seed items. For instance, given a seed item that comprises a part item listing, a cluster to which that part item listing is identified.

One or more part item listings are provided in response to the input based on the identified cluster, as shown at block 806. For instance, in the context of search, a search results page can be provided that includes part item listings from the identified cluster. In the context of recommendation, one or more recommendations can be provided for part item listings from the identified cluster.

Exemplary Operating Environment

Figure 9:
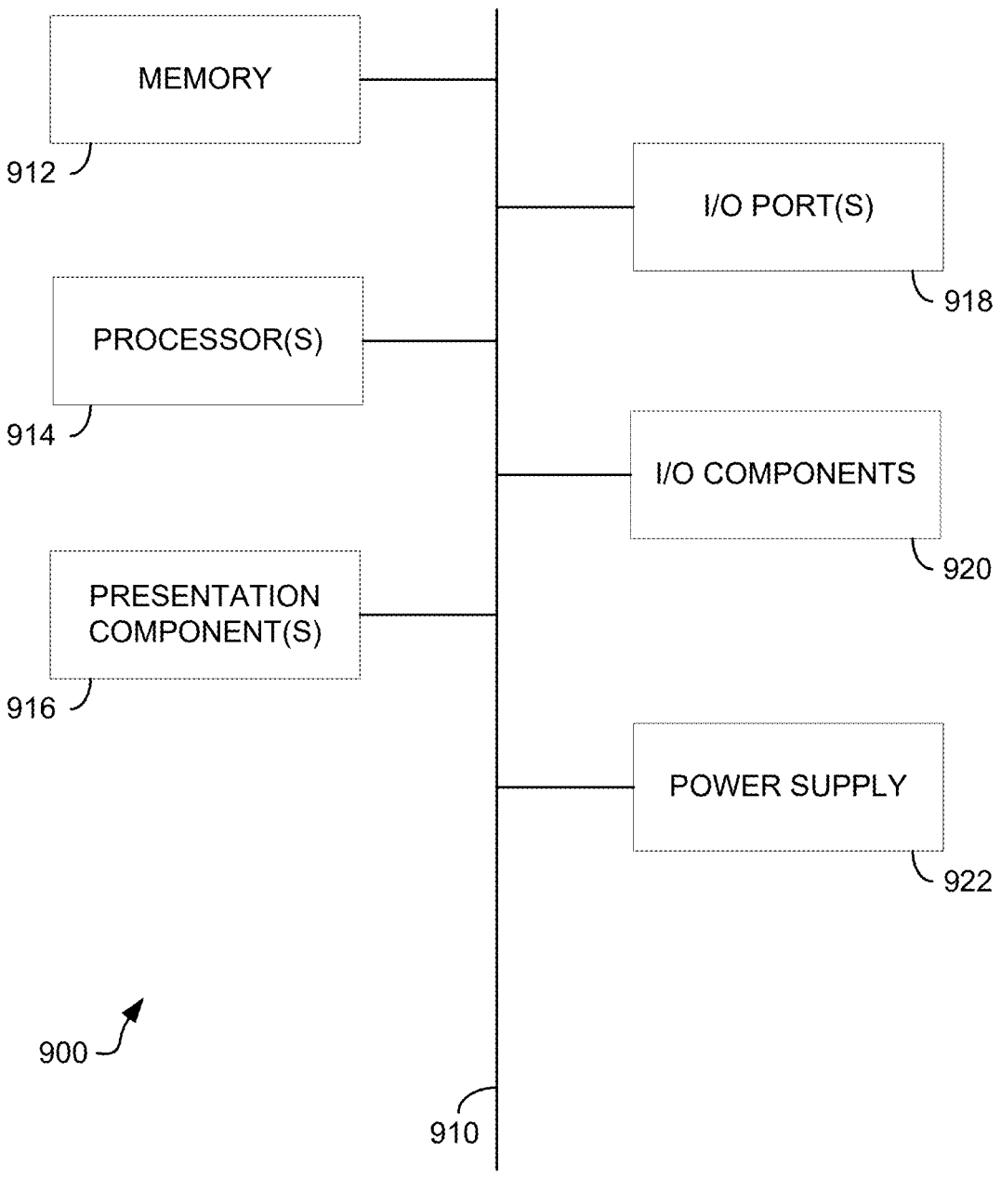
FIG. 9 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 9 in particular, an exemplary operating environment for implementing embodiments of the present technology is shown and designated generally as computing device 900. Computing device 900 is but one example of a suitable computing environment and is not intended to suggest any limitation as to the scope of use or functionality of the technology. Neither should the computing device 900 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present technology. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:

accessing item data for each of a plurality of part item listings, the item data for each part item listing comprising fitment data;

for each part item listing, embedding the item data including the fitment data to generate an item-level embedding to provide a plurality of item-level embeddings for the plurality of part item listings, wherein each item-level embedding represents a different part item listing from the plurality of part item listings based on at least the fitment data for each part item listing;

clustering the plurality of item-level embeddings for the plurality of part item listings to generate a plurality of clusters, each cluster comprising one or more a subset of the plurality of item-level embeddings for a corresponding subset of different part item listings from the plurality of part item listings; and storing cluster data for the plurality of clusters, the cluster data for each cluster identifying interchangeable part items by associating a cluster identifier and an item listing identifier for each part item listing represented by each item- level embedding in the cluster.

2. The one or more computer storage media of claim 1, wherein clustering the item-level embeddings to generate the plurality of clusters comprises:

generating similarity scores between pairs of item-level embeddings; and forming the clusters using the similarity scores.

3. The one or more computer storage media of claim 2, wherein forming the clusters using the similarity scores comprises:

generating a similarity matrix that identifies similarity between pairs of item-level embeddings based on the similarity scores;

generating a plurality of graphs, each graph having nodes representing part item listings and edges between nodes based on similarity between the item-level embeddings corresponding to the nodes; and identifying each graph as a cluster.

4. The one or more computer storage media of claim 3, wherein the similarity matrix is constrained by one or more constraint rules.

5. The one or more computer storage media of claim 3, wherein each graph from the plurality of graphs is fully connected.

6. The one or more computer storage media of claim 3, wherein forming the clusters using the similarity scores further comprises:

identifying a first part item listing in a first graph as an outlier based on price; and removing the first part item listing from the first graph.

7. The one or more computer storage media of claim 1, wherein the operations further comprise:

receiving a search query;

identifying, from the plurality of clusters, a first cluster based on the search query; and providing one or more search results based on the cluster data for the first cluster.

8. The one or more computer storage media of claim 7, wherein the search query comprises a part number, and wherein the first cluster is identified based on the first cluster having an item listing identifier for a part item listing having the part number.

9. The one or more computer storage media of claim 7, wherein identifying, from the plurality of clusters, the first cluster based on the search query comprises:

identifying one or more part item listings relevant to the search query; and identifying the first cluster based on the one or more part item listings.

10. The one or more computer storage media of claim 1, wherein the operations further comprise:

receiving a seed item;

identifying, from the plurality of clusters, a first cluster based on the seed item; and providing one or more part item recommendations based on the cluster data for the first cluster.

11. A computer-implemented method comprising:

accessing item data for each of a plurality of part item listings, the item data for each part item listing comprising fitment data;

for each part item listing, embedding the item data including the fitment data to generate an item-level embedding to provide a plurality of item-level embeddings for the plurality of part item listings, wherein each item-level embedding represents a different part item listing from the plurality of part item listings based on at least the fitment data for each part item listing;

clustering the plurality of item-level embeddings for the plurality of part item listings to generate a plurality of clusters, each cluster comprising a subset of the plurality of item-level embeddings for a corresponding subset of different part item listings from the plurality of part item listings;

storing, in a data store, cluster data for the plurality of clusters, the cluster data for each cluster identifying interchangeable part items by associating a cluster identifier and an item listing identifier for each part item listing represented by each item-level embedding in the cluster;

receiving a search input;

identifying, from the plurality of clusters, a first cluster based on the search input; and providing, as a response to the search input, an indication of one or more part item listings based on the cluster data for the first cluster.

12. The computer-implemented method of claim 11, wherein clustering the item-level embeddings to generate the plurality of clusters comprises:

generating similarity scores between pairs of item-level embeddings; and forming the clusters using the similarity scores.

13. The computer-implemented method of claim 12, wherein forming the clusters using the similarity scores comprises:

generating a similarity matrix that identifies similarity between pairs of item-level embeddings based on the similarity scores;

generating a plurality of graphs, each graph having nodes representing part item listings and edges between nodes based on similarity between the item-level embeddings corresponding to the nodes; and identifying each graph as a cluster.

14. The computer-implemented method of claim 13, wherein the similarity matrix is constrained by one or more constraint rules.

15. The computer-implemented method of claim 13, forming the clusters using the similarity scores further comprises:

identifying a first part item listing in a first graph as an outlier based on price; and removing the first part item listing from the first graph.

16. The computer-implemented method of claim 11, wherein the search input comprises a search query identifying a part number, and wherein the first cluster is identified based on the first cluster having an item listing identifier for a part item listing having the part number.

17. The computer-implemented method of claim 11, wherein the search input comprises a search query, and wherein identifying, from the plurality of clusters, the first cluster based on the search query comprises:

identifying an initial set of one or more part item listings relevant to the search query; and identifying the first cluster based on the initial set of one or more part item listings.

18. The computer-implemented method of claim 11, wherein the search input comprises a seed item.

19. A computer system comprising:

one or more processors; and one or more computer storage media storing computer-useable instructions that, when used by the one or more processors, cause the computer system to perform operations, the operations comprising:

accessing item data for each of a plurality of part item listings, the item data for each part item listing comprising fitment data;

for each part item listing, embedding the item data including the fitment data to generate an item-level embedding to provide a plurality of item-level embeddings for the plurality of part item listings, wherein each item-level embedding represents a different part item listing from the plurality of part item listings based on at least the fitment data for each part item listing;

generating a constrained similarity matrix based on similarity scores between pairs of item-level embeddings and one or more constraint rules;

generating a plurality of graphs using the constrained similarity matrix, each graph having nodes representing part item listings and edges between nodes based on the constrained similarity matrix, wherein each graph is identified as a cluster to provide a plurality of clusters, each cluster comprising a subset of the plurality of item-level embeddings for a corresponding subset of different part item listings from the plurality of part item listings; and storing cluster data for the plurality of clusters, the cluster data for each cluster identifying interchangeable part items by associating a cluster identifier and an item listing identifier for each item embedding in the cluster.

20. The computer system of claim 19, wherein the operations further comprise:

receiving an input;

identifying, from the plurality of clusters, a first cluster based on the input; and providing an indication of one or more part item listings based on the cluster data for the first cluster.

* * * * *